(12) United States Patent
Habboub

(10) Patent No.: US 10,850,868 B1
(45) Date of Patent: Dec. 1, 2020

(54) OPERATIONAL SCENARIO SPECIFIC ADAPTIVE SENSOR VOTER

(71) Applicant: Rockwell Collins, Inc., Cedar Rapids, IA (US)

(72) Inventor: Bassel Habboub, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 262 days.

(21) Appl. No.: 15/991,598

(22) Filed: May 29, 2018

(51) Int. Cl.
*B64F 5/60* (2017.01)
*G07C 5/08* (2006.01)
*G07C 13/00* (2006.01)

(52) U.S. Cl.
CPC .............. *B64F 5/60* (2017.01); *G07C 5/0841* (2013.01); *G07C 13/00* (2013.01)

(58) Field of Classification Search
CPC ......... B64F 5/60; G07C 5/0841; G07C 13/00; G05D 1/005; G05D 1/0077; B64D 2045/0085; G01D 5/24457; G01D 5/24461; G01D 5/24466; B64C 13/42
USPC ......................... 702/183, 182; 701/36, 3, 465
See application file for complete search history.

(56) References Cited

U.S. PATENT DOCUMENTS

| | | | |
|---|---|---|---|
| 5,457,634 A * | 10/1995 | Chakravarty | G05D 1/0005 340/994 |
| 6,212,649 B1 * | 4/2001 | Yalowitz | G06F 11/1479 709/201 |
| 8,483,987 B2 * | 7/2013 | Terao | G05D 23/19 702/117 |
| 2004/0098140 A1 * | 5/2004 | Hess | G05D 1/0077 700/3 |
| 2010/0185343 A1 * | 7/2010 | Broquet | G01P 13/025 701/3 |
| 2014/0244078 A1 * | 8/2014 | Downey | G05D 1/08 701/11 |
| 2015/0251691 A1 * | 9/2015 | Tamaizumi | B62D 5/0472 701/41 |
| 2016/0248525 A1 * | 8/2016 | Rauworth | H04B 17/23 |
| 2016/0307598 A1 * | 10/2016 | Johns | H04N 5/93 |
| 2016/0375732 A1 * | 12/2016 | Lazar, II | B60C 23/0488 73/115.08 |
| 2017/0139411 A1 * | 5/2017 | Hartung | G05D 1/0077 |
| 2017/0248648 A1 * | 8/2017 | Wingerter | G01D 5/24457 |
| 2018/0237148 A1 * | 8/2018 | Hehn | B64C 39/024 |
| 2018/0340554 A1 * | 11/2018 | Hutchison | B64C 13/42 |
| 2019/0357292 A1 * | 11/2019 | Cirik | H04W 76/19 |

* cited by examiner

*Primary Examiner* — Richard A Goldman
(74) *Attorney, Agent, or Firm* — Suiter Swantz pc llo

(57) ABSTRACT

A voter configured for in-flight tuning based on flight phase and operational scenario receives sensor signals and applies adaptive tolerances. The voter allows integration of high-integrity sensors with less accurate, low-integrity sensors, or even sensors that are susceptible to noise, dropouts, interference or sabotage without compromising the voted signal integrity or availability. The voter composites low-integrity sensor signals to produce a quasi-high-integrity sensor signal suitable for inclusion in a golden signal and provides sensor fusion.

20 Claims, 3 Drawing Sheets

OPERATIONAL SCENARIO SPECIFIC ADAPTIVE SENSOR VOTER

BACKGROUND

Aircraft generally have multiple sensors to provide data to onboard systems. When the integrity and availability of a sensor signal do not meet the integrity and availability required by the onboard systems, multiple copies and variations of that signal are provided and routed through selection logic or voters that are configured to increase the signal's integrity and manage its availability. Having redundant copies of a signal does not automatically translate to increased availability. Adding redundant sensors, especially lower-integrity backup sensors, may hurt the availability compared to just one primary sensor if the voting logic is not correctly architected and designed.

Increasing and maintaining the signal's integrity are achieved by performing complex failure scenario analysis and carefully tuning the voter to achieve certain objectives to guarantee a certain integrity level.

Existing voting and signal selection architecture is incapable of adapting to changes during flight to ensure the minimum required signal integrity is always maintained. Therefore, performance requirements and design decisions are defined around mitigation of the most severe failure scenarios during the most critical flight phases. The resulting design decisions lead to the integration of costly, high-integrity, redundant, and sometimes dissimilar sensors that are voted to tight tolerances. To meet the strict integrity requirements derived from the analysis of the most severe failure scenarios, the entire signal path is required to be voted to tight tolerances during all flight phases. Likewise, certain operational scenarios may introduce unwanted and unavoidable noise that may interfere with certain sensors. Tight tolerances and strict monitor performance limits may lead to nuisance faults since the voters are operating at tight tolerances all the time, which may include phases or scenarios when certain sensors are less accurate or susceptible to noise and interference, leading to lower signal availability.

In some cases, when there is a very high probability a good sensor could be excluded, monitor inhibit conditions may be set to prevent sensor exclusion. However, when those conditions are asserted, signal integrity is no longer guaranteed such that the signal integrity is downgraded to the integrity of the lowest integrity sensor. Erroneous data may be passed through undetectably.

Consequently, it would be advantageous if an apparatus existed that is suitable for selecting sensors based on flight phase and scenario specific criteria

SUMMARY

In one aspect, embodiments of the inventive concepts disclosed herein are directed to a voter configured for in-flight tuning based on flight phase and operational scenario. The voter allows integration of high-integrity sensors with less accurate, low-integrity sensors, or even sensors that are susceptible to noise, dropouts, interference or sabotage without compromising the voted signal integrity or availability.

In a further aspect, the voter composites low-integrity sensor signals to produce a quasi-high-integrity sensor signal suitable for inclusion in a golden signal.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
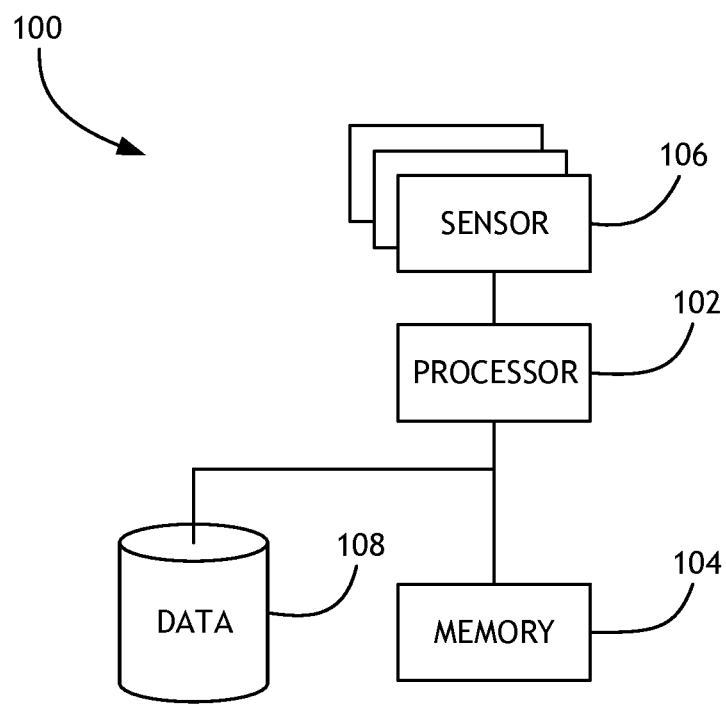
FIG. 1 shows a block diagram of an exemplary embodiment according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a sensor voter that adjusts tolerances (performance curves) in-flight to tune the selection algorithm and minimize dormant failures, loss failures, and active faults, and provides sensor fusion.

Figure 2:
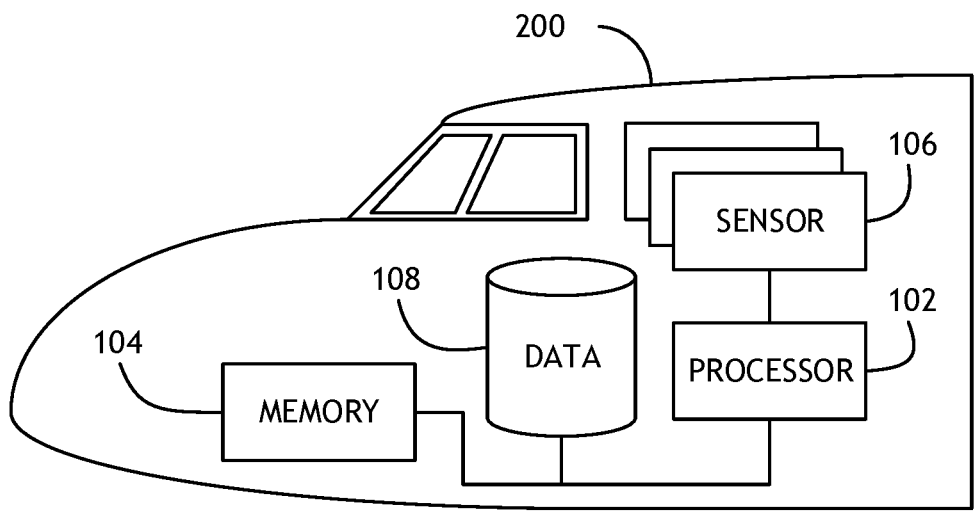
FIG. 2 shows an environmental view of an exemplary embodiment according to the inventive concepts disclosed herein.

Referring to FIGS. 1 and 2, a block diagram of an exemplary embodiment and an environmental view of such embodiment according to the inventive concepts disclosed herein are shown. A system 100 according to at least one embodiment includes a processor 102 and memory 104 connected to the processor 102 for embodying processor executable code. The system 100 also includes a plurality of sensors 106 connected to the processor 102, each of the plurality of sensors 106 has a corresponding integrity value.

A single sensor 106 may generally provide insufficient data for many applications. The processor 102 may composite multiple signals to create a blended, golden signal. The multiple signals are identified via a voter algorithm, executed by the processor 102, to remove faulty signals. Signals may be faulty for a variety of reasons including sensor integrity that is insufficient for the level of signal integrity necessary.

In at least one embodiment, one or more data storage elements 108 for providing sensor data to the processor 102. The sensor data or data storage element 108 may also have a corresponding integrity value. In some embodiments, data subject to cumulative errors, such as dead-reckoning data, may be used without compromising integrity or availability of the voted signal. In at least one embodiment, sensor data may be captured and analyzed over multiple flights and missions, and during various flight phases, to further define appropriate tolerances during future flights.

In at least one embodiment, the processor 102 monitors each sensor 106 for persistently exceeding some threshold accuracy, taking into consideration static and dynamic environmental contributions and the expected sensor accuracy under those conditions. Sensors 106 may be specifically monitored for latent failures that exceed accuracy levels with environmental static contributions but don't necessarily violate desired performance specification.

In at least one embodiment, the processor 102 may monitor similar sensors 106 against dissimilar sensors 106 for any generic faults that could cause similar sensors 106 to provide identically erroneous information.

The processor 102 may continuously monitor sensors 106 for oscillatory faults using real-time frequency spectrum analysis. The processor 102 may process oscillatory faults independently from offset faults.

The processor 102 may analyze a flight plan to alter the voting algorithm at certain time indexes or at certain specific locations. The processor 102 may automatically compute performance curves and adjust the voting algorithm parameters based on the required integrity and availability.

In at least one embodiment, the processor 102 uses real-time frequency spectrum analysis to fine-tune the frequency ranges of the stages of the structural filtering within a predefined range depending on flight phases and scenarios.

In at least one embodiment, the processor 102 may detect potential avalanche events and adjust thresholds accordingly to prevent the loss of the entire signal following the failure of one of the sensors 106.

In at least one embodiment, the system 100 is incorporated into a mobile platform such as an aircraft 200 or ground vehicle, including unmanned or even disposable aircraft.

In at least one embodiment, the processor 102 includes structural filtering of noise that is introduced to inertial sensors 106 from the vibrations of the aircraft 200 structure.

In at least one embodiment, the system 100 reports the current state of each voted signal to control laws, including the guaranteed signal integrity and availability for the current mode or phase of operation. The system 100 allows control law gains to be fine-tuned in real-time to accommodate varying flight phases, scenarios, and input signal integrity and availability.

While specific embodiments are described with relation to aircraft and flight-specific aspects, embodiments specific to ground based mobile platforms are also envisioned. Specifically, ground vehicle sensors may also have failure states that are impacted by operational scenarios. A sensor fusion voter according to embodiments of the inventive concepts disclosed herein may be applicable to such ground based mobile platforms.

Figure 3:
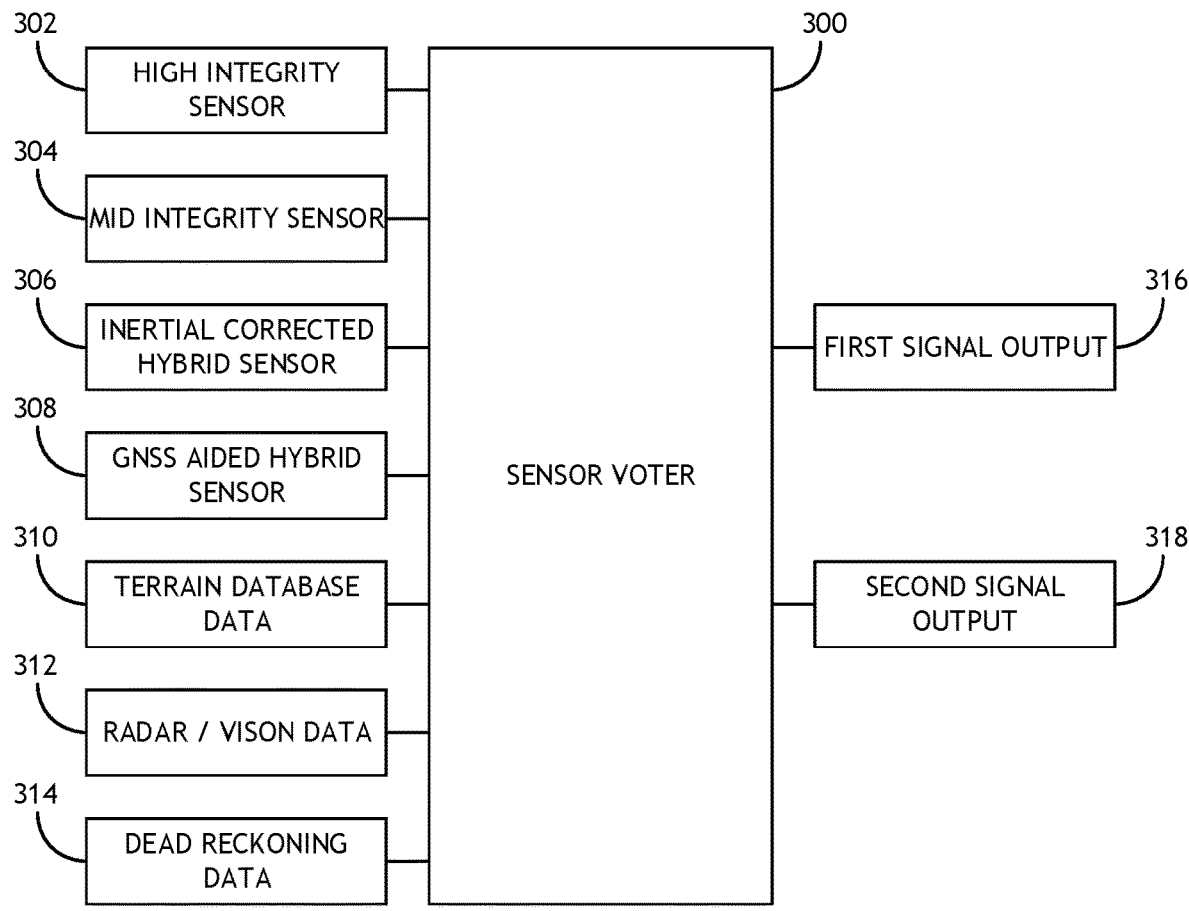
FIG. 3 shows a block diagram of a voter according to the inventive concepts disclosed here.

Referring to FIG. 3, a block diagram of a voter 300 according to the inventive concepts disclosed here is shown. The voter 300 receives input from a plurality of sensors 302, 304, 306, 308 and data sources 310, 312, 314, and outputs a primary signal 316 along with an ancillary signal 318. In at least one embodiment, the plurality of sensors 302, 304, 306, 308 includes one or more high-integrity sensors 302, one or more mid integrity sensors 304, one or more inertial corrected hybrid sensors 306, and/or one or more global navigation satellite system (GNSS) aided hybrid sensors 308. In at least one embodiment, the one or more data sources 310, 312, 314 includes one or more terrain databases 310, one or more radar/vision data sources 312, and/or one or more dead reckoning data sources 314.

Every sensor 302, 304, 306, 308 and data source 310, 312, 314 may be associated with an integrity value. The sensor voter 300 organizes sensors 302, 304, 306, 308 and data sources 310, 312 according to integrity values. The sensor voter 300 may select sensors 302, 304, 306, 308 and data sources 310, 312 from each integrity value.

In at least one embodiment, sensors 302, 304, 306, 308 and data sources 310, 312 having a lower integrity value may be combined to produce one or more composite sensor signals having a higher integrity value; the composite sensor signal may then be voted with other higher integrity signals.

A single sensor 302, 304, 306, 308 or data source 310, 312 generally provides insufficient data for in-flight applications. The voter 300, in addition to identifying sensors 302, 304, 306, 308 that are faulty, may composite signals from multiple sensors 302, 304, 306, 308 within integrity blocks to create a blended signal. Signals may be faulty for a variety of reasons including sensor integrity that is insufficient for the level of signal integrity necessary, environmental noise, etc.

In at least one embodiment, blended signals may be segregated according to voting blocks or modules of the composited signals based on their integrity values. In at least one embodiment, separate voting modules may be used for high-integrity sensors 302 and lower integrity sensors 304, 306, 308. In that case, the primary signal 316 may comprise a voted signal or golden signal of the highest integrity sensors 302, 304, 306, 308 while the ancillary signal 318 may comprise integrity and availability data corresponding to the primary golden signal 316.

In at least one embodiment, the voter 300 monitors each sensor 302, 304, 306, 308 for persistently exceeding some threshold accuracy.

In at least one embodiment, the voter 300 may monitor similar sensors 302, 304, 306, 308 against dissimilar sensors 302, 304, 306, 308 for any generic faults. Likewise, the voter 300 may continuously monitor sensors 302, 304, 306, 308 for oscillatory faults using real-time frequency spectrum analysis independently of offset faults.

In at least one embodiment, the voter 300 identifies or receives a flight phase or operational scenario. Each flight phase or operational scenario is associated with a predefined set of sensor tolerances. For example a takeoff or landing phase may be associated with certain tolerances for high-integrity sensors 302 and certain tolerances for lower integrity sensors 304, 306, 308; likewise, a cruising altitude phase may be associated with alternative tolerances for high-integrity sensors 302 and lower integrity sensors 304, 306, 308. In each case, the associated tolerances may be the most lenient tolerances within acceptable requirements.

In at least one embodiment, the voter 300 calculates required sensor tolerances based on required integrity and availably values for certain operational scenarios or flight phases. The voter 300 may include functions associating the required sensor tolerances with various sets of parameters including, but not limited to, monitor thresholds, fault detection times, signal correction amount, signal correction rate, signal equalization amount, signal equalization rate, signal centering amount, and signal centering rate. In at least one embodiment, the voter 300 may include Kalman filters, linear quadratic estimation algorithms, and/or neural network algorithms associating such parameters with the resulting sensor tolerances. In at least one embodiment, the voter 300 may continuously alter or tune sensor tolerances during all flight phases where aspects of those flight phases comprise parameters of the tuning functions.

Based on the flight phase or operational scenario specific tolerances, the voter 300 adjusts one or more parameters for identifying sensor faults. The voter 300 may then execute a voting algorithm to identify potentially faulty sensors 302, 304, 306, 308 according to the specific tolerances. The impact of tight tolerances during critical phases on overall availability is thereby minimized. Tighter tolerances during critical phases will not impact other phases when sensors 302, 304, 306, 308 might be less accurate or more susceptible to noise and interference. Variable tolerances lower the probability of nuisance faults removing otherwise good sensors 302, 304, 306, 308 and requiring a system reset. There are limitations on sensor recovery if the system is reset in-air to restore normal operation after the loss of critical sensors 302, 304, 306, 308. Resetting the system in-air may lead to erroneous sensor data and provide undetectably misleading information especially if the restored sensors 302, 304, 306, 308 win the majority vote.

When the voter 300 cannot maintain the required signal integrity within the tolerances defined by the flight phase or operational scenario, the voter 300 will set a "signal degraded" flag (if the consuming functions allow operation with degraded signals). If the architecture does not allow the consumption of degraded signals, or when the voter 300 cannot maintain the required degraded signal integrity, the voter may set a "signal failed" flag and suspend output. In at least one embodiment, the primary signal 316 may comprise a signal identified by the voting algorithm while the ancillary signal 318 comprises the current state of the voter 300, including the integrity of the signal.

In at least one embodiment, when a sensor 302, 304, 306, 308 is fail-latched and taken out of the voting logic for exceeding the required tolerances, instead of the sensor 302, 304, 306, 308 being permanently rejected for the remainder of the flight, the voter 300 may monitor the sensor 302, 304, 306, 308 for a configurable period of time to determine if the fail-latched sensor 302, 304, 306, 308 consistently comes back within the required tolerances.

In at least one embodiment, the voter 300 continues monitoring during traditional monitor inhibit conditions by isolating the affected sensors 302, 304, 306, 308 and entering a restricted monitoring mode. The voter 300 may analyze signals before and after the restricted monitoring mode is invoked. In at least one embodiment, the voter 300 may analyze the noise that precipitated the restricted monitoring mode, and apply an adaptive filter to compensate for such noise.

In at least one embodiment, the voter 300 automatically restores miscompare-latched sensors 302, 304, 306, 308 when the voter 300 determines that they agree with the majority vote. The restored sensors 302, 304, 306, 308 may be assigned a lower integrity score for the remainder of flight.

The voter 300 automatically configures the voting modules to ensure sensors 302, 304, 306, 308 with restricted exposure times are isolated and only used when needed for only the maximum allowed time. Exposure time in this application is defined as the time that a specific sensor 302, 304, 306, 308 is solely driving and directly influencing the output signals 316, 318. Specifying strict exposure time is particularly useful when using sensors 302, 304, 306, 308 that are susceptible to sabotage or when using hybrid sensors 308 that provide low-accuracy information in certain flight phases or operational scenarios. Restricting exposure time also limits the influence of dead reckoning data 314 on the output signals 316, 318 during critical phases or primary sensor dropouts.

In at least one embodiment, sensors 302, 304, 306, 308 that exhibit an unexpected and excessive amount of noise, sensors 302, 304, 306, 308 that have a restricted exposure time, sensors 302, 304, 306, 308 that register dormant failures, sensors 302, 304, 306, 308 that were healed inflight, and low-accuracy sensors 302, 304, 306, 308 are all isolated in a separate, isolation voting block. The isolation block may filter and correct the signals. The isolated signals may be equalized with comparison to the high-integrity voting block, and then voted within the isolation block before being integrated into the main voting logic as one signal.

In at least one embodiment, the isolation voting block implements voting algorithms to maximize the integrity of the selected signal as compared to having each impacted sensor 302, 304, 306, 308 voted individually within voting logic including all of the sensors 302, 304, 306, 308.

In at least one embodiment, when a dormant failure is detected, the sensor is placed in a voting block with a lower integrity score. The voting block algorithm may modify tolerances to compensate for potential active faults that could cause large deviations when combined with a dormant failure.

In at least one embodiment, the voter 300 is configured to automatically tune voting parameters based on required integrity and availability values for each flight phase or scenario. The voter 300 analyzes faults in order to identify dormant faults, loss failures, and active faults; the combination of failures that a system must protect against in order to meet signal integrity and availability requirements. In at least one embodiment, the voter 300 performs continuous, real-time failure scenario analysis while in flight or during a mission to determine the combination of failures that the voter 300 must protect against to maintain a required signal integrity and availability.

In one exemplary embodiment, in a system with four attitude sensors 302, 304, 306, 308 where one sensor signal is lost. The voter 300 executes a full time dormant failure detection function. Furthermore, the voter 300 detects active faults and rejects the corresponding sensor 302, 304, 306, 308 before the primary output signal 316 exceeds a true or ideal signal for the required detection time. In the present example, because three sensors remain active, the voter 300 may maintain relaxed tolerances because one active fault does not result in a deviation of the voted primary output signal 316, exceeding the true signal by a critical threshold.

In the present example, it is not necessary to protect against simultaneous dormant and active faults. However, if the required integrity is greater so as to warrant protection against such simultaneous faults, the voter 300 may remove dormant signals from the voting algorithms or lower detection thresholds to ensure the voted primary output signal 316 is not inflated by the dormant value that exceeds the required threshold undetected.

Figure 4:
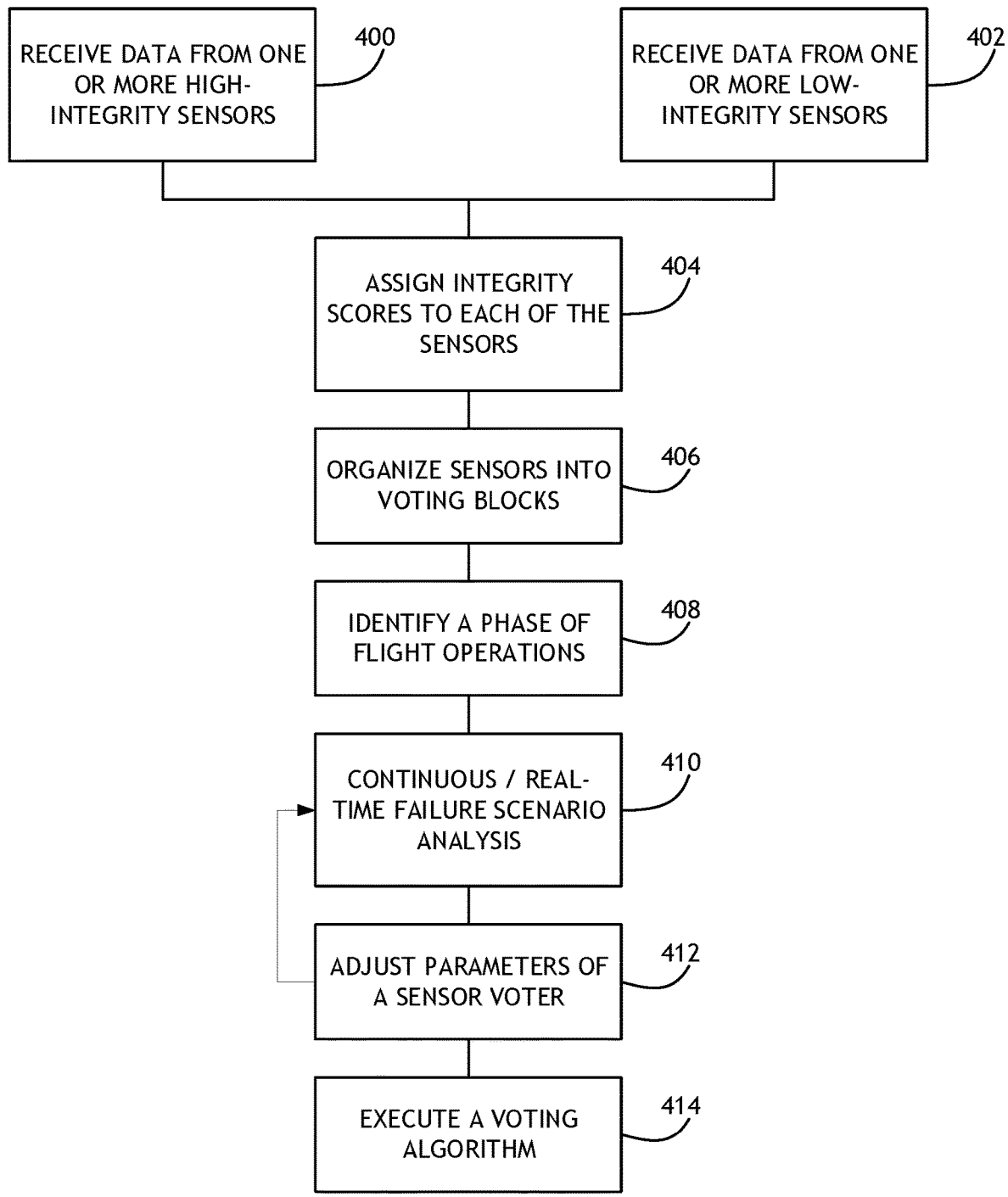
FIG. 4 shows a flowchart of an exemplary embodiment according to the inventive concepts disclosed herein.

Referring to FIG. 4, a flowchart of an exemplary embodiment according to the inventive concepts disclosed herein is shown. A voter receives 400 data from one or more high-integrity sensors and receives 402 data from one or more low-integrity sensors. Each sensor is assigned 404 an integrity score, and the sensors are organized 406 into voting blocks based on those integrity scores.

The voter identifies 408 or receives a flight phase or operational scenario. Each flight phase or operational scenario is associated with a predefined set of performance curves. For example a takeoff or landing phase may be associated with certain performance curves for high-integrity sensors and certain performance curves for low-integrity sensors; likewise, a cruising altitude phase may be associated with alternative performance curves for high-integrity sensors and low-integrity sensors.

Based on the flight phase or operational scenario performance curves, the voter performs 410 real-time failure scenario analysis to identify one or more sets of parameters to meet the performance curves. Once those parameters are identified, the voter may continuously fine-tune those parameters within a specified phase/mission via continuously performing 410 additional real-time failure scenario analysis. Such continuous, real-time analysis may include application of Kalman filters and neural network processing.

Based on flight phase or operational scenario specific tolerances identified via failure scenario analysis, the voter adjusts 412 one or more parameters for identifying sensor faults. The voter may then execute 414 a voting algorithm to identify potentially faulty sensors according to specific tolerances. In each case, the associated tolerances may be the most lenient tolerances within acceptable requirements. The impact of tight tolerances during critical phases on overall availability is thereby minimized. Tighter tolerances during critical phases will not impact other phases when sensors might be less accurate or more susceptible to noise and interference. Variable tolerances lower the probability of nuisance faults removing otherwise good sensors and requiring a sensor reset. There are limitations on sensor recovery if the system is reset in-air to restore normal operation after the loss of critical sensors. Resetting the system in-air may lead to erroneous sensor data and provide undetectably misleading information especially if the restored sensors win the majority vote.

When the voter cannot maintain the required signal integrity within the tolerances defined by the flight phase or operational scenario, the voter will set a "signal degraded" flag (if the consuming functions allow operation with degraded signals). If the architecture does not allow the consumption of degraded signals, or when the voter cannot maintain the required degraded signal integrity, the voter may set a "signal failed" flag and suspend output.

In at least one embodiment, when a sensor is fail-latched and taken out of the voting logic for exceeding the required tolerances, instead of the sensor being permanently rejected for the remainder of the flight, the voter may monitor the sensor for a configurable period of time to determine if the fail-latched sensor consistently comes back within the required tolerances.

In at least one embodiment, the voter continues monitoring during traditional monitor inhibit conditions by isolating the affected sensors and entering a restricted monitoring mode. The voter may analyze signals before and after the restricted monitoring mode is invoked. In at least one embodiment, the voter may analyze the noise that precipitated the restricted monitoring mode, and apply an adaptive filter to compensate for such noise.

In at least one embodiment, the voter automatically restores miscompare-latched sensors when the voter determines that they agree with the majority vote. The restored sensors may be assigned a lower integrity score for the remainder of flight.

In at least one embodiment, separate voting modules may be used for high-integrity sensors and low-integrity sensors. Lower-integrity sensors are typically selected based on availability. They are required to be configured as back-up sensors and included in the selection algorithm (voted in) only when the signal availability is compromised and one or more of the primary sensors are lost. Non-faulty low-integrity sensors may be composited to produce one or more quasi-high-integrity sensors for inclusion in a golden signal.

The voter automatically configures the voting modules to ensure sensors with restricted exposure times are isolated and only used when needed for only the maximum allowed time. Exposure time in this application is defined as the time that a specific sensor is solely driving and directly influencing the voter output (i.e., voter output integrity is equal to sensor output integrity and voter output availability is equal to sensor output availability). Specifying strict exposure time is particularly useful when using sensors that are susceptible to sabotage or when using hybrid sensors that provide low-accuracy information in certain flight phases or operational scenarios. Restricting exposure time also limits the influence of dead reckoning information on the voted signal during critical phases or primary sensor dropouts.

In at least one embodiment, sensors that exhibit an unexpected and excessive amount of noise, sensors that have a restricted exposure time, sensors that register dormant failures, sensors that were healed inflight, and low-accuracy sensors are all isolated in a separate, isolation voting block. The isolation block may filter and correct the signals. The isolated signals may be equalized with comparison to the high-integrity voting block, and then voted within the isolation block before being integrated into the main voting logic as one signal.

In at least one embodiment, the isolation voting block implements voting algorithms to maximize the integrity of the selected signal as compared to having each impacted sensor voted individually within voting logic including all of the sensors.

Systems and methods according to embodiments of the present disclosure eliminated the need to design a specific high-integrity solution for each sub-function in critical sub-systems. The voter may dynamically fine tune the voting algorithm and monitor sensor performance with respect to tolerances and detection times, in real-time, to maintain required signal integrity and availability.

Embodiments of the present disclosure may be implemented in flight computers, common computing modules, embedded in firmware within the sensors themselves as part of a fully connected mesh voting network, etc.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
    at least one processor in data communication with a memory storing processor executable code for configuring the at least one processor to:
       receive a plurality of sensor signals;
       perform failure scenario analysis in real-time to determine a combination of failures that would affect signal integrity and availability for specific operational scenario;
       apply a set of operational scenario specific tolerances to the plurality of sensor signals, each of the sensor tolerances corresponding to at least one of a monitor threshold, a fault detection time, signal correction amount, signal correction rate, a signal equalization amount, a signal equalization rate, a signal centering amount, and a signal centering rate;
       apply a voting algorithm to the plurality of sensor signals; and
       identify one or more of the plurality of sensor signals outside the set of operational scenario tolerances.

2. The computer apparatus of claim 1, wherein:
    the set of operational scenario specific tolerances comprises a first set of tolerances associated with a first operational phase; and
    the processor executable code further configures the at least one processor to:
       apply a second set of operational scenario specific tolerances associated with a second operational phase to the plurality of sensor signals;
       apply a voting algorithm to the plurality of sensor signals; and
       identify one or more of the plurality of sensor signals outside the second set of operational scenario tolerances.

3. The computer apparatus of claim 1, wherein:
    the processor executable code further configures the at least one processor to:
       assign a first set of sensor signals to a first voting block associated with a first integrity value; and
       assign a second set of sensor signals to a second voting block associated with a second integrity value; and
    applying the voting algorithm to the plurality of sensor signals comprises applying the voting algorithm independently to each of the first voting block and the second voting block.

4. The computer apparatus of claim 3, wherein the processor executable code further configures the at least one processor to:
    blend two or more sensor signals from the first voting block into a golden signal; and
    blend two or more sensor signals from the second voting block into a composite signal.

5. The computer apparatus of claim 4, wherein the processor executable code further configures the at least one processor to blend the composite signal with the golden signal.

6. The computer apparatus of claim 1, wherein the processor executable code further configures the at least one processor to assign a one or more sensor signals identified as faulty by the voting algorithm to an isolation voting block.

7. The computer apparatus of claim 6, wherein the processor executable code further configures the at least one processor to:
    identify at least one sensor signal from the isolation voting block that consistently produces data within a current set of tolerances; and
    apply the voting algorithm to the at least one sensor signal.

8. A method comprising:
    receiving a plurality of sensor signals;
    performing failure scenario analysis in real-time to determine a combination of failures that would affect signal integrity and availability for specific flight phases;
    applying a first set of flight-phase specific tolerances, derived during the failure scenario analysis, to the plurality of sensor signals;
    applying a voting algorithm to the plurality of sensor signals after applying the first set of flight-phase specific tolerances;
    applying a second set of flight-phase specific tolerances to the plurality of sensor signals; and
    applying the voting algorithm to the plurality of sensor signals after applying the second set of flight-phase specific tolerances,
    wherein:
       the first set of flight-phase specific tolerances is associated with a first flight phase; and
       the second set of flight-phase specific tolerances is associated with a second flight phase.

9. The method of claim 8, further comprising:
    assigning a first set of sensor signals to a first voting block associated with a first integrity value; and
    assigning a second set of sensor signals to a second voting block associated with a second integrity value,
    wherein:
       applying the voting algorithm to the plurality of sensor signals comprises applying the voting algorithm independently to each of the first voting block and the second voting block.

10. The method of claim 9, further comprising:
blending two or more sensor signals from the first voting block into a golden signal; and
blending two or more sensor signals from the second voting block into a composite signal.

11. The method of claim 10, further comprising blending the composite signal with the golden signal.

12. The method of claim 8, further comprising assigning a one or more sensor signals identified as faulty by the voting algorithm to an isolation voting block.

13. The method of claim 12, further comprising:
identifying at least one sensor signal from the isolation voting block that consistently produces data within a current set of tolerances; and
applying the voting algorithm to the at least one sensor signal.

14. An aircraft comprising:
a plurality of sensors;
at least one processor in data communication with the plurality of sensors and a memory storing processor executable code for configuring the at least one processor to:
receive a plurality of sensor signals from the plurality of sensors;
perform real-time failure scenario analysis to determine a combination of failures that would affect signal integrity and availability for specific flight phases;
apply a set of flight-phase specific tolerances to the plurality of sensor signals, each of the sensor tolerances corresponding to at least one of a monitor threshold, a fault detection time, signal correction amount, signal correction rate, a signal equalization amount, a signal equalization amount, a signal equalization rate, a signal centering amount, and a signal centering rate;
apply a voting algorithm to the plurality of sensor signals; and
identify one or more of the plurality of sensor signals outside the set of flight-phase tolerances.

15. The aircraft of claim 14, wherein:
the set of flight-phase specific tolerances comprises a first set of flight specific tolerances associated with a first flight phase; and
the processor executable code further configures the at least one processor to:
apply a second set of flight-phase specific tolerances associated with a second flight phase to the plurality of sensor signals;
apply a voting algorithm to the plurality of sensor signals; and
identify one or more of the plurality of sensor signals outside the second set of flight-phase tolerances.

16. The aircraft of claim 14, wherein:
the processor executable code further configures the at least one processor to:
assign a first set of sensor signals to a first voting block associated with a first integrity value; and
assign a second set of sensor signals to a second voting block associated with a second integrity value; and
applying the voting algorithm to the plurality of sensor signals comprises applying the voting algorithm independently to each of the first voting block and the second voting block.

17. The aircraft of claim 16, wherein
the processor executable code further configures the at least one processor to:
blend two or more sensor signals from the first voting block into a golden signal; and
blend two or more sensor signals from the second voting block into a composite signal.

18. The aircraft of claim 17, wherein the processor executable code further configures the at least one processor to blend the composite signal with the golden signal.

19. The aircraft of claim 14, wherein the processor executable code further configures the at least one processor to assign one or more of the plurality of sensor signals identified as faulty by the voting algorithm to an isolation voting block.

20. The aircraft of claim 19, wherein the processor executable code further configures the at least one processor to:
identify at least one sensor signal from the isolation voting block that
consistently produces data within a current set of tolerances; and
apply the voting algorithm to the at least one sensor.

* * * * *